(12) United States Patent
Mohns et al.

(10) Patent No.: US 8,613,411 B1
(45) Date of Patent: Dec. 24, 2013

(54) RETAINER DEVICE

(75) Inventors: Brad Mohns, Jackson, MN (US); Jason Rosenberg, Fairmont, MN (US)

(73) Assignee: C & B Manufacturing, Jackson, MN (US)

( * ) Notice: Subject to any disclaimer, the term of this patent is extended or adjusted under 35 U.S.C. 154(b) by 0 days.

(21) Appl. No.: 13/232,504

(22) Filed: Sep. 14, 2011

(51) Int. Cl.
*F16L 3/08* (2006.01)

(52) U.S. Cl.
USPC ............ 248/74.3; 248/49; 248/68.1; 174/135

(58) Field of Classification Search
USPC ........... 248/49, 51, 62, 63, 65, 68.1, 69, 74.2, 248/74.3, 176.1, 316.7; 174/68.3, 72 A, 135
See application file for complete search history.

(56) References Cited

U.S. PATENT DOCUMENTS

| | | | |
|---|---|---|---|
| 3,391,432 A | 7/1968 | Durocher | |
| 4,818,236 A | 4/1989 | Nakayama | |
| 5,027,571 A | 7/1991 | Wolff | |
| 5,115,260 A | 5/1992 | Hayward | |
| 5,215,280 A * | 6/1993 | Tigrett | 248/68.1 |
| 5,399,812 A | 3/1995 | Woszczyna | |
| 5,673,468 A | 10/1997 | Pumpe | |
| 6,268,566 B1 | 7/2001 | Takiguchi | |
| 6,464,178 B1 * | 10/2002 | Kidd, III | 248/51 |
| 6,809,266 B1 * | 10/2004 | Hoi et al. | 174/135 |
| 6,948,241 B2 | 9/2005 | Tadokoro | |
| 7,045,709 B2 * | 5/2006 | Koike et al. | 174/480 |
| 7,926,604 B2 | 4/2011 | Ammer | |
| 8,123,179 B2 * | 2/2012 | Galle | 248/65 |
| 2005/0247826 A1 * | 11/2005 | Tadokoro | 248/49 |
| 2007/0034750 A1 * | 2/2007 | Pierce et al. | 248/49 |
| 2011/0061932 A1 | 3/2011 | Ogawa | |

* cited by examiner

*Primary Examiner* — Gwendolyn Baxter
(74) *Attorney, Agent, or Firm* — Jeffrey A. Proehl; Woods, Fuller, Shultz & Smith, P.C.

(57) ABSTRACT

A retainer for retaining an elongate flexible element on a support and comprising a perimeter wall defining an interior, with the perimeter wall having opposite ends each having end edges defining end openings. A capture slot extends between the opposite ends of the perimeter wall. The capture slot is defined by a pair of slot edges on the perimeter wall, and the slot edges extend from a first one of the end edges to a second one of the end edges. The capture slot extends along a convoluted path between the opposite ends that requires forming at least one bend in the flexible element to move the element through the capture slot and into the interior of the perimeter wall.

1 Claim, 5 Drawing Sheets

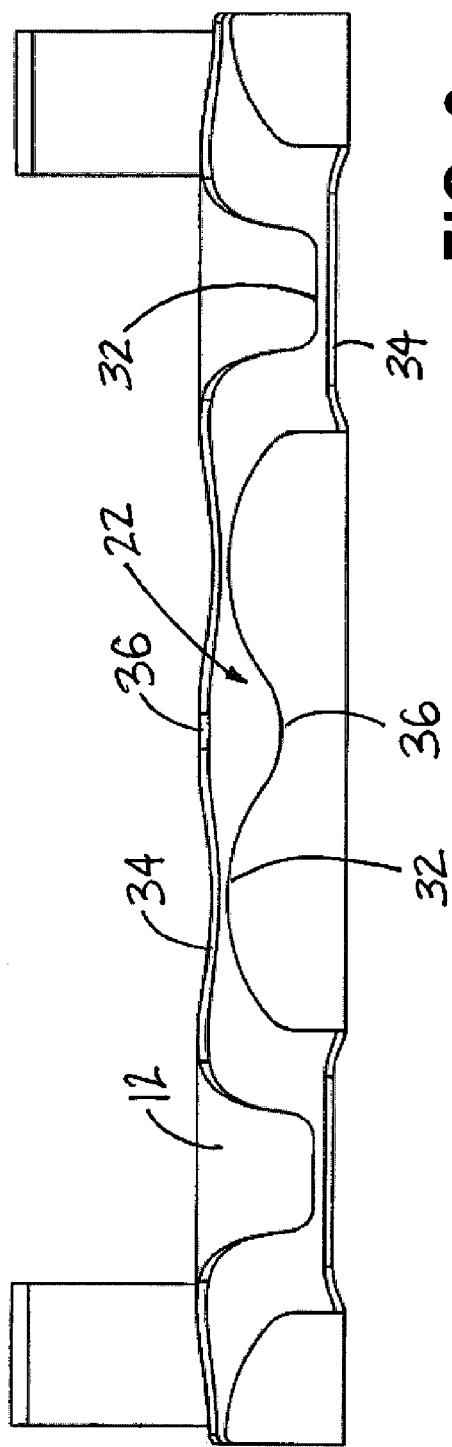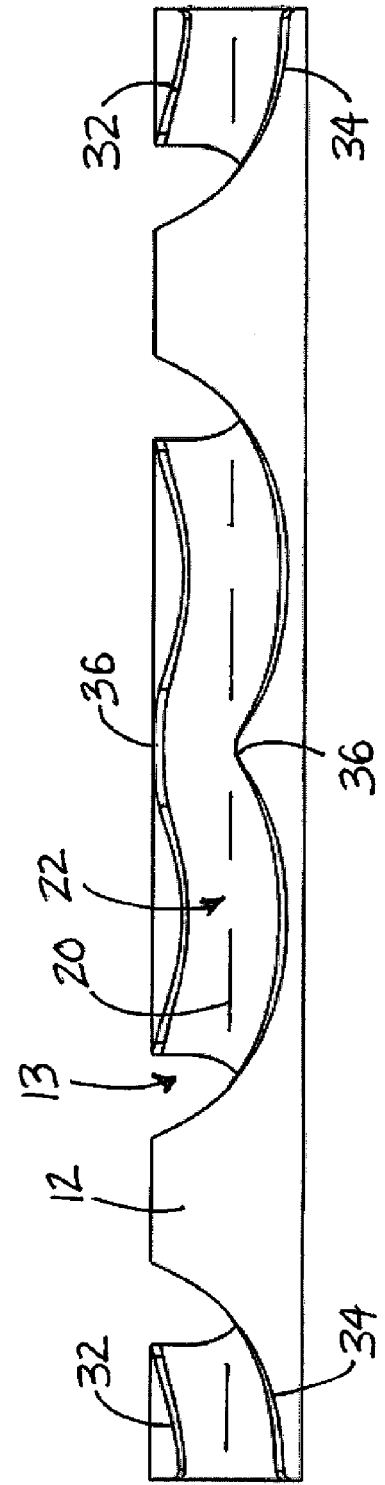

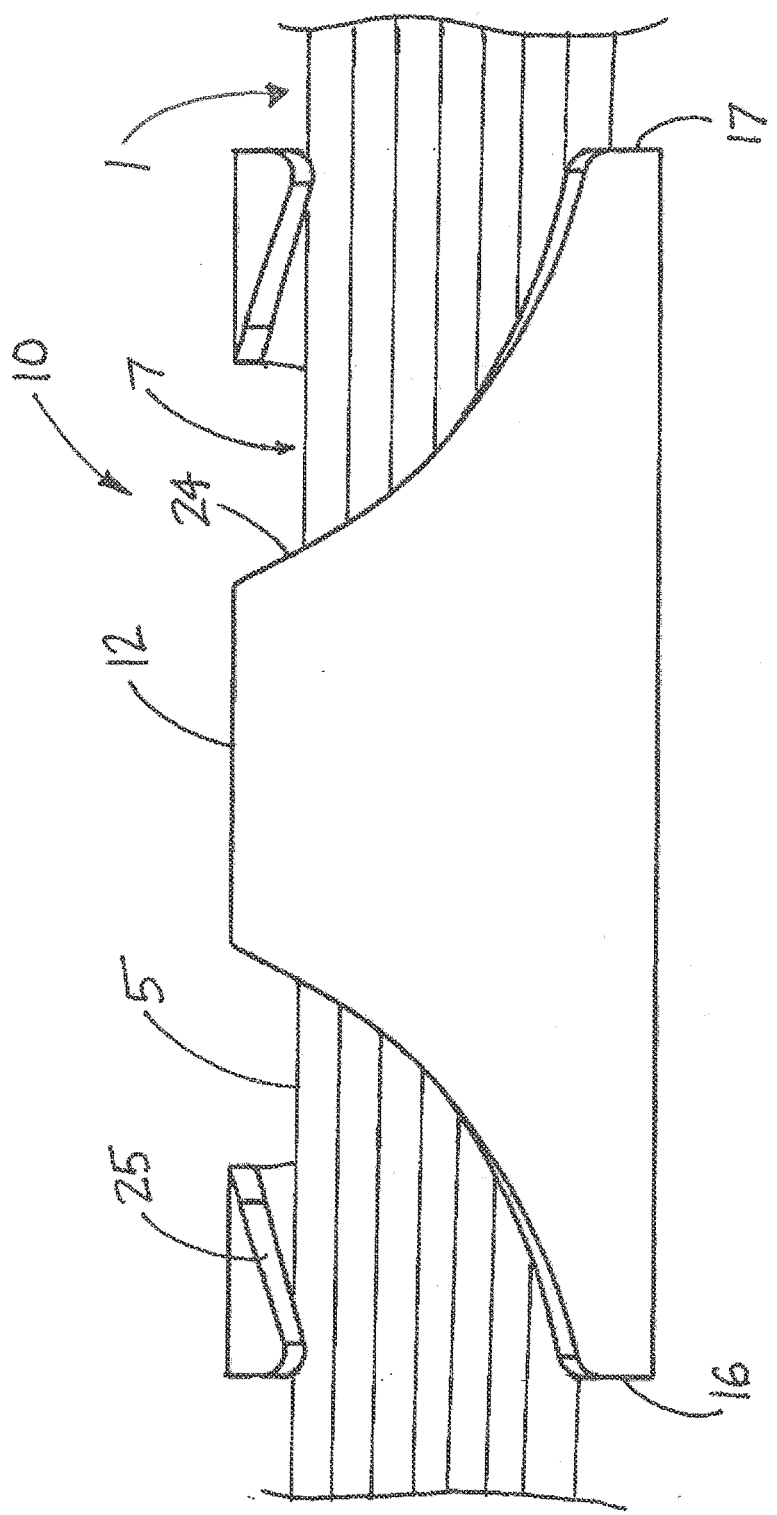

RETAINER DEVICE

BACKGROUND

Field

The present disclosure relates to device for holding elongate objects and more particularly pertains to a new retainer device for proving a secure mounting for elongate flexible elements that permits easy mounting and dismounting of the elements on the device.

SUMMARY

In one aspect, the present disclosure relates to a retainer for retaining an elongate flexible element on a support. The retainer comprises a perimeter wall defining an interior. The perimeter wall has opposite ends each having end edges defining end openings. A capture slot extends between the opposite ends of the perimeter wall, and is defined by a pair of slot edges on the perimeter wall. The pair of slot edges extends from a first one of the end edges to a second one of the end edges. The capture slot extends along a convoluted path between the opposite ends. The convoluted path of the capture slot may require forming at least one bend in the flexible element to move the element through the capture slot and into the interior of the perimeter wall.

In another aspect, the disclosure relates to a system for retaining elongate flexible elements. The system may comprise a support having a surface, and a retainer mounted on the support. The retainer may comprise a perimeter wall defining an interior, and the perimeter wall has opposite ends each having end edges defining end openings. The retainer has a capture slot extending between the opposite ends of the perimeter wall. The capture slot is defined by a pair of slot edges on the perimeter wall, and the pair of slot edges extends from a first one of the end edges to a second one of the end edges. The capture slot extends along a convoluted path between the opposite ends. The convoluted path of the capture slot requires forming at least one bend in the flexible element to move the element through the capture slot and into the interior of the perimeter wall. At least one elongate flexible element is positioned in the interior of the perimeter wall of the retainer.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3 is a schematic front view of the retainer device embodiment shown in FIG. 1.

FIG. 4 is a schematic top view of the retainer device of FIG. 3 with the mounting tab removed for greater clarity.

FIG. 6 is a schematic top view of the embodiment of FIG. 2 with the mounting tab removed for greater clarity.

DETAILED DESCRIPTION

Figure 1:
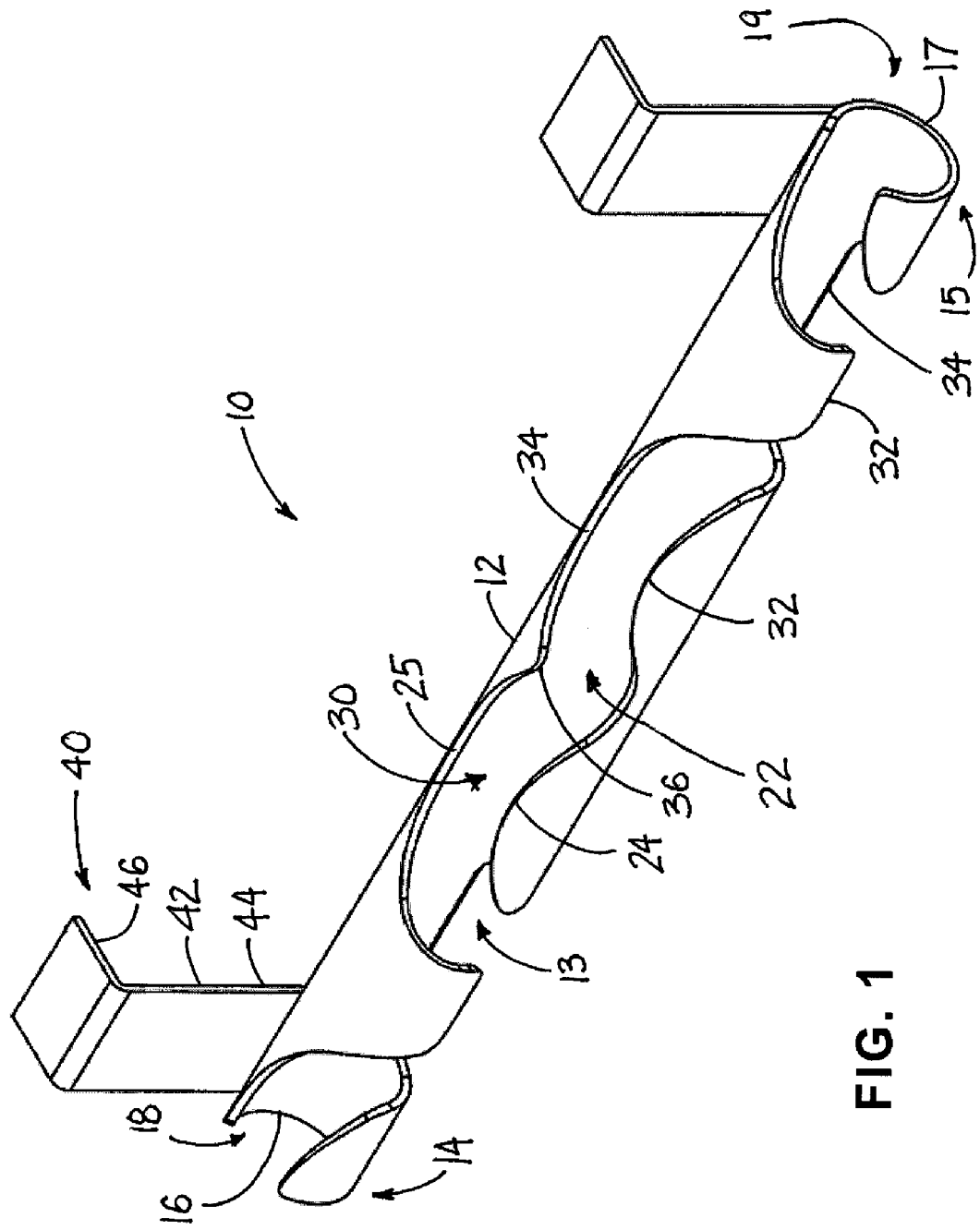
FIG. 1 is a schematic perspective view of an embodiment of a new retainer device according to the present disclosure.

With reference now to the drawings, and in particular to FIGS. 1 through 6 thereof, a new retainer device embodying the principles and concepts of the disclosed subject matter will be described.

In one aspect, the disclosure relates to a retainer device 10 for retaining an elongate flexible element 1 on a support 3. The retainer device 10 may be mounted on the support 3 to thereby hold the elongate flexible element 1 on the support in a manner that permits the element 1 to be easily mounted on, and removed from, the retainer device 10. Illustratively, the elongate flexible element 1 comprises at least one electrical wire 5, such as wire including a metal conductor encased in an insulator, and the flexible element may comprise a bundle 7 of wires 7. It should be recognized that although the illustrative application described herein is directed to electrical wires, the usage of the retainer device is not so limited and other elongate flexible elements may be retained by the device 10, including, for example, tubing, optical fiber, rope, cord, bare wire, as well as virtually any other elongate, flexible element.

The retainer device 10 may comprise a perimeter wall 12 that defines an interior 13 that receives a portion of the flexible element 1 when the element is mounted on the device 10. The perimeter wall 12 has opposite ends 14, 15 with respective end edges 16, 17, such as a first end edge and a second end edge that define respective end openings 18, 19. The perimeter wall 12 may have a central axis 20 that extends between the opposite ends 14, 15, and that is substantially centered on each transverse cross section of the perimeter wall. In many of the most preferred embodiments of the device 10, the axis 20 is substantially straight in character. The perimeter wall 12 may have a substantially tubular configuration, and the substantially tubular configuration may be substantially cylindrical in shape, although other cross sectional shapes of the perimeter wall may be utilized.

A significant aspect of the retainer device 10 is a capture slot 22 that permits the elongate flexible element 1 to move into and out of the interior of the perimeter wall without, for example, having to thread an end of the flexible element 1 through one of the end openings 18, 19 of the perimeter wall. The capture slot 22 is formed in the perimeter wall 12 and that extends between the opposite ends 14, 15. The capture slot 22 extends from the first end 14 to the second end 15 and is defined by a pair of slot edges 24, 25 on the perimeter wall 12. The pair of slot edges 24, 25 correspondingly extends from the first end edge 16 to the second end edge 17, and thus the slot 22 is in communication with the first 18 and second 19 end openings.

A gap 30 is formed between the pair of slot edges 24, 25, and the shape or contour of the slot edges may be similar to form complementary shapes such that the size or width of the gap between the edges 24, 25 may be substantially uniform along the slot 22 between the opposite ends 14, 15 of the perimeter wall, although in many embodiments there may be some variation in the width as the shape of the edges may not be exactly the same. The width of the gap of the slot may have various sizes. In many embodiments, the width of the gap 30 of the slot may be less than or approximately equal to the half of the distance across the widest part of the interior of the perimeter wall (e.g., the radius for cylindrical perimeter walls), although in some applications the capture slot will function effectively with a gap width up to approximately 75 percent of the distance across the interior of the perimeter wall.

A significant aspect of the device 10 is the character of the capture slot 22, which may extending along a convoluted path between the opposite ends, as the slot edges 24, 25 are not linear and straight along the entirety of the distance between the end edges 16, 17 (although a portion of the slot edges may be linear). The convoluted path of the capture slot 22 preferably requires the forming of at least one bend in the flexible element 1 in order to move the element 1 through the gap of the capture slot and into the interior of the perimeter wall, where the element may be allowed to relax and adopt a straighter and more linear character that reflects the straight character of the axis 20. In some embodiments of the device 10, the convoluted path of the capture slot 22 requires forming at least two bends in the flexible element to move the element through the capture slot and into the interior of the perimeter wall, and typically (although not necessarily) these bends will be in substantially opposite directions which requires a somewhat greater degree of convolution of the flexible element 1 to move the element through the slot 22.

The one or more bends required by the convoluted slot to move the element through the slot enhance the trapping effect of the convoluted slot on the element 1, since similar bending of the element is required to move the element out through the slot to remove the element from the interior of the perimeter wall, thus reducing the likelihood of unintended removal of the element from the interior (although allowing intentional removal).

Figure 2:
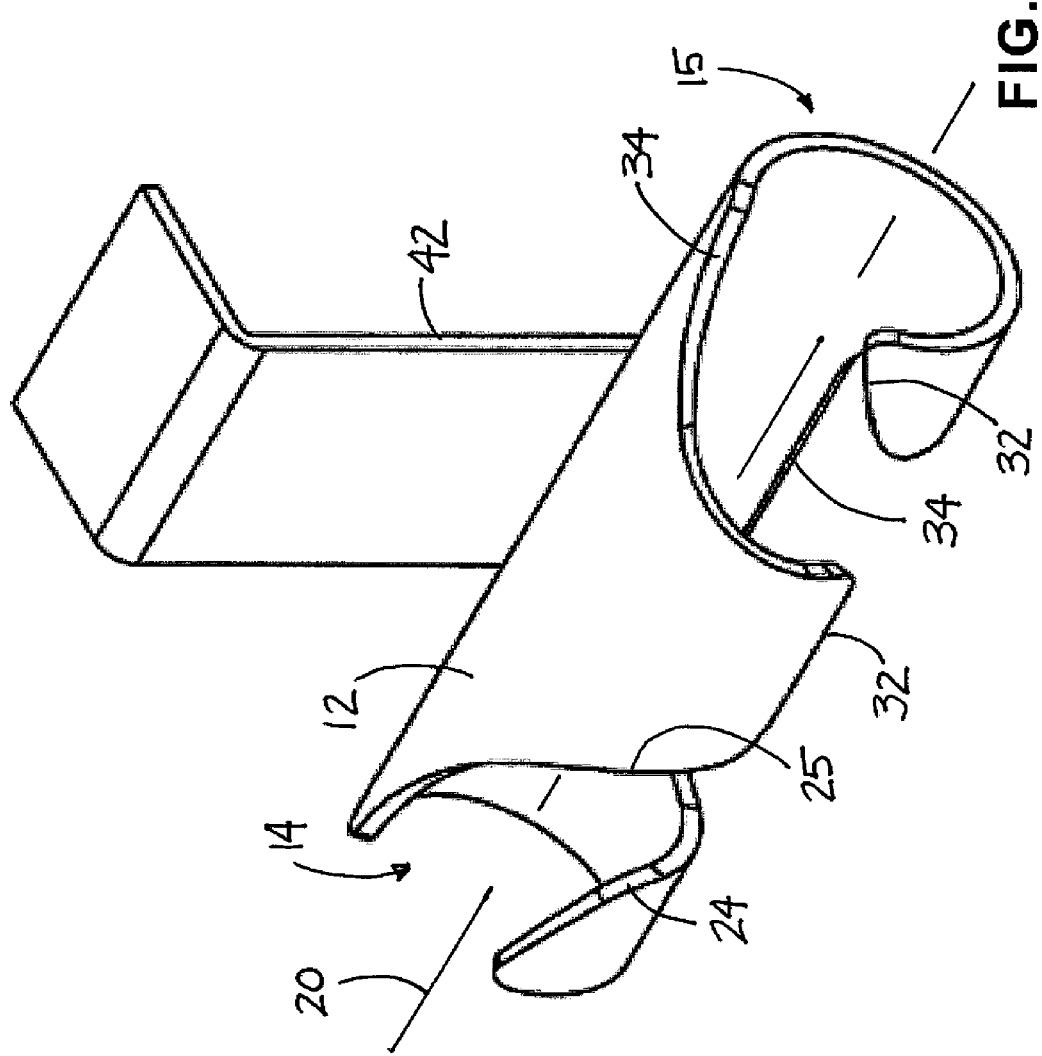
FIG. 2 is a schematic perspective view of another embodiment of the retainer device, according to an illustrative embodiment.
Figure 5:
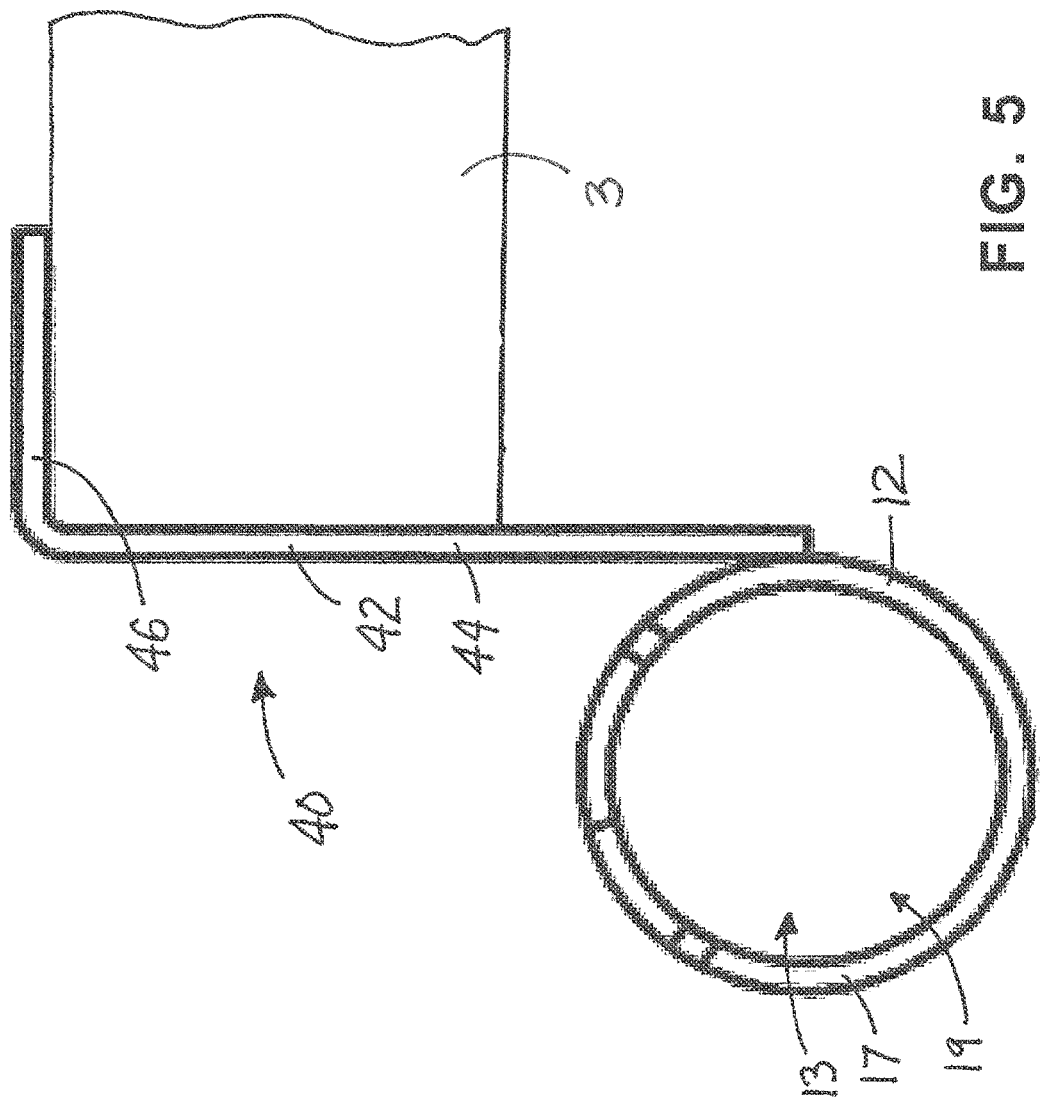
FIG. 5 is a schematic end view of the retainer device.

In some embodiments, the convoluted path of the capture slot may form at least one pair of complementary peaks 32 and valleys 34, with a peak 32 or protrusion formed on one slot edge having a complementary valley 34 or indentation formed on the other slot edge in substantial opposition to each other. Each pair of complementary peaks and valleys may require a separate bend to be formed in the flexible element 1 in order to move the element through the capture slot, and thus the more pairs of peaks and valleys, the greater degree of resistance of moving the element through the slot. The bends that are required to be made in the flexible element 1 made be made simultaneously, or may be made sequentially from one end to the other. The portions of the slot edges 24, 25 forming the peaks and valleys may also have smaller undulations 36 that may or may not be in complementary pairs. Typically, the slot edges at the peaks and valleys are curved or rounded in character to reduce the possibility of damage to the flexible element 1 or injury to the hands of an assembler when the element 1 is mounted onto or out of the interior of the perimeter wall. The length of the perimeter wall, or the distance between the opposite ends 14, 15, may be varied, and FIGS. 1 and 2 show devices with perimeter walls of different lengths, with the relatively longer device having more pair of peaks and valleys than the relatively shorter device.

The retainer device 10 may also include a mounting element 40 for facilitating the mounting of the perimeter wall 12 on a support 3. While the perimeter wall 12 may be directly mounted on a support 3, such as, for example, by adhesion, welding or fastening, the mounting element 40 may facilitate mounting in a manner not possible or convenient for the perimeter wall alone. The mounting element 40 may be mounted on the perimeter wall and may extend away from the perimeter wall. In some embodiments, the mounting element 40 is mounted on an outer surface of the perimeter wall, and preferably is mounted and positioned on the perimeter wall in a manner that does not interfere with the movement of the elongate element through the capture slot. In some illustrative embodiments, the mounting element 40 comprises a mounting tab 42 that is configured for mounting on the particular support. In an illustrative embodiment, at least a portion 44 of the mounting tab extends substantially tangential to a portion of the perimeter wall. The mounting tab may have at least a pair of portions, with the first portion 44 being oriented substantially perpendicular to the second portion 46.

The perimeter wall 12 may be substantially uniformly thick, although this is not critical to the device 10. While some embodiments of the perimeter wall 12 may be formed of a metal, other embodiments may be formed of different materials such as, for example, plastics. In some embodiments, the perimeter wall is substantially rigid in nature and not able to be flexed by hand pressure, while in other embodiments the material of the perimeter wall provides a degree of resilient flexibility.

Notably, the retainer device 10 may provide mounting of elongate flexible elements on the device without having to thread the ends of the elements through the device, thus simplifying mounting especially in the case of very long elements. Further, the mounting and dismounting of the elongate flexible elements is relatively easily accomplished through hand manipulation of the elongate elements as long as there is some degree of flexibility in the element that permits some degree of bending of the element by hand. The degree of security of the retaining function may be controlled by the degree to which the peaks and valleys of the convoluted capture slot deviate from a relatively straight path. The convolution of the capture slot permits the elongate elements to be retained without requiring the device to be closely tailored to the size (e.g., diameter) of the elements, as no securing gripping of the individual elements is necessary, and thus one interior size is able to accommodate several different element sizes and quantities, even in the same bundle. The device 10 may also be used to retain elements that are held together in a bundle such as a wire loom or tape-wrapped collection of wires. Further, some longitudinal movement of the elongate elements through the interior of the perimeter wall may be permitted without significant resistance.

Upon movement of the flexible element into the interior of the perimeter wall, the force applied to the element that causes the bend to be formed in the element may be released, such as by the assembler relaxing his or her grip on the element used to form the bend, and the resiliency of the element may return the element to a straighter shape. For flexible elements that have limited resiliency, the element may be manipulated by the assembler to have a straighter shape in the interior of the perimeter wall, such as by pulling on portions extending from opposite ends of the device 10. Thus, the assembler may use his or her hands (e.g., fingers and thumbs) to begin moving the element through the slot at one end of the perimeter wall, and progressively move toward the other end by moving the element through the gap of the slot into the interior, bending the element where necessary to match the contour of the slot, and then relaxing the grip on portions of the element that are in the interior so that those portions can relax into a straighter configuration. This process is continued until the opposite end of the perimeter wall is reached.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A retainer for retaining an elongate flexible element on a support, the retainer comprising:
    a perimeter wall defining an interior, the perimeter wall having opposite ends each having end edges defining end openings;
    a capture slot extending between the opposite ends of the perimeter wall, the capture slot being defined by a pair of slot edges on the perimeter wall, the pair of slot edges extending from a first one of the end edges to a second one of the end edges, the capture slot extending along a convoluted path between the opposite ends;
    wherein the convoluted path of the capture slot requires forming at least one bend in the flexible element to move the element through the capture slot and into the interior of the perimeter wall;
    wherein the convoluted path of the capture slot forms a plurality of peaks and valleys, a peak and a valley being positioned in substantial opposition to each other across a gap between the slot edges, a first set of an opposed peak and valley being located toward a first one of the opposite ends and a second set of an opposed peak and valley being located toward a second one of the opposite ends; and
    wherein the convoluted path is configured such that the peaks of the first and second sets are relatively longer than at least one said peak located between the first and second sets, and the valleys of the first and second sets are relatively deeper than at least one said valley located between the first and second sets;
    wherein the perimeter wall is configured so that the elongate flexible element is able to relax to an unbent condition upon movement into the interior of the perimeter wall;
    wherein the convoluted path of the capture slot requires forming at least two bends in the flexible element to move the element through the capture slot and into the interior of the perimeter wall;
    wherein each of the first set and the second set includes a pair of peaks and a pair of valleys;
    wherein the first set and the second set are each located adjacent to the respective one of said end openings;
    a mounting element on the perimeter wall for facilitating mounting of the perimeter wall on the support;
    wherein the mounting element comprises a mounting tab having at least a portion of the mounting tab extending substantially tangential to a portion of the perimeter wall;
    wherein the mounting tab has another portion oriented substantially perpendicular to the at least one portion;
    wherein the perimeter wall has a substantially straight central axis between the opposite ends;
    wherein the perimeter wall has a substantially tubular configuration; and
    wherein the substantially tubular configuration is substantially cylindrical in shape.

* * * * *